United States Patent [19]

Hunter, deceased et al.

[11] 4,102,292

[45] Jul. 25, 1978

[54] AMPHIBIOUS VEHICLE

[76] Inventors: Ralph W. Hunter, deceased, late of Jacksonville, Fla.; Marcia Hunter McLaulin, administrator, P.O. Box 1227, Sanford, Fla. 32771

[21] Appl. No.: 831,126

[22] Filed: Sep. 7, 1977

Related U.S. Application Data

[63] Continuation of Ser. No. 729,813, Oct. 5, 1976, abandoned, which is a continuation-in-part of Ser. No. 657,230, Feb. 11, 1976, abandoned.

[51] Int. Cl.² .............................................. B60F 3/00
[52] U.S. Cl. ................................... 115/1 R; 180/6.5; 305/34
[58] Field of Search ............... 115/1 R, 1 A, 1 B; 180/6.28, 6.5, 6.7, 9.2 R, 126; 305/13, 34, 57; 114/67 A

[56] References Cited

U.S. PATENT DOCUMENTS

| | | | |
|---|---|---|---|
| 2,565,293 | 8/1951 | Aydelott et al. | 180/6.5 |
| 3,720,863 | 3/1973 | Ringland et al. | 180/6.5 |
| 3,756,335 | 9/1973 | Eisele et al. | 180/6.28 |
| 3,951,093 | 4/1976 | Poche | 114/67 A |

OTHER PUBLICATIONS

"Mechanix Illustrated", Nov. 1957, p. 65 –Boat Without a Hull–.

Primary Examiner—Trygve M. Blix
Assistant Examiner—Charles E. Frankfort
Attorney, Agent, or Firm—Herbert M. Birch

[57] ABSTRACT

An amphibious vehicle for travel in water or on land with transversely spaced power driven buoyant drums fore and aft of the vehicle and intermediate buoyant idler drums likewise transversely spaced around which are reeved spaced flexible endless belt traction apparatus formed with buoyant cross tread such as elongated transversely mounted pneumatic tires or gas filled tubes to provide driving traction in the manner of a crawler type tractor. Also, a single steering control and system for directional control of the vehicle in water or on all forms of terrain surfaces is devised and power from a Diesel-Generator system is transmitted to an electric motor to drive the respective buoyant power drums at either the fore or aft end of the vehicle in each respective spaced belt or track. Such drive arrangement of the respective drums maintains tautness in the belt and reduces tensile load on the traction belts reeved over the midmounted buoyant idler drums between the respective fore and aft buoyant power drums when the power drums are selectively driven in either a forward or a reverse direction.

2 Claims, 14 Drawing Figures

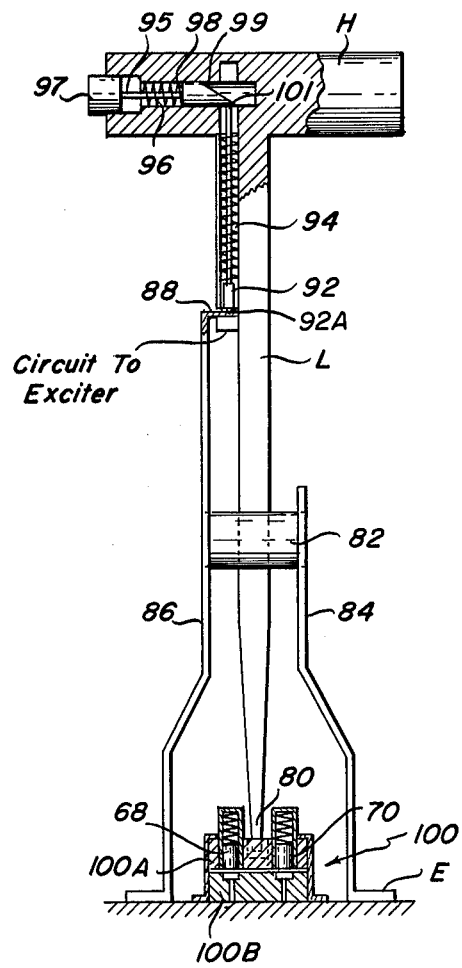
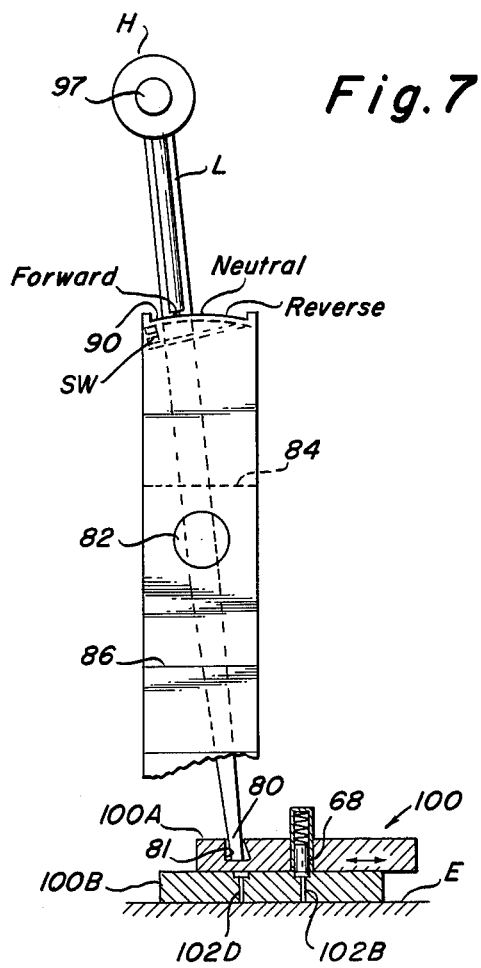
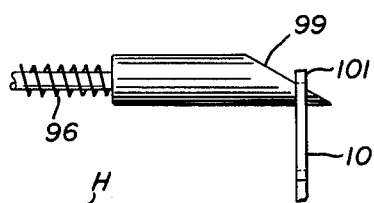
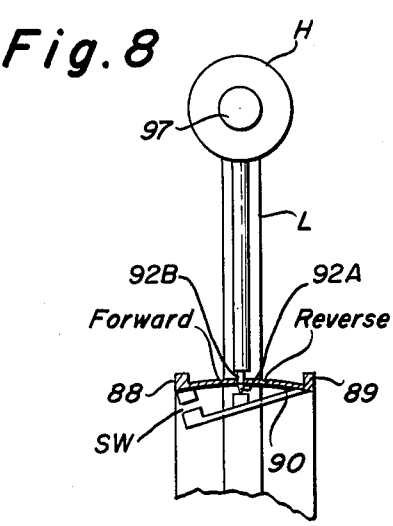
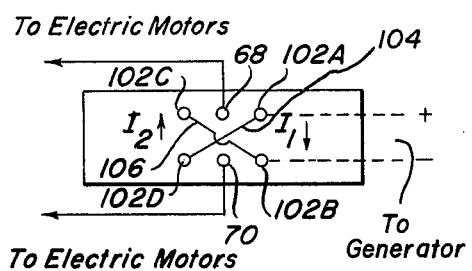

Conventional Tire Valve

AMPHIBIOUS VEHICLE

BACKGROUND OF THE INVENTION

This is a continuation of application Ser. No. 729,813 filed Oct. 5, 1976 now abandoned which is a continuation-in-part of prior application Ser. No. 657,230 filed Feb. 11, 1976 and entitled AMPHIBIOUS VEHICLE, now abandoned.

FIELD OF INVENTION

The present invention relates to endless track means for amphibious landing vehicles, such as land and water vehicles capable of travel over terrain of all descriptions and in water without preparatory conversion to compensate for either medium.

DESCRIPTION OF PRIOR ART

Heretofore, prior to the present novel invention there have been developed and patented many forms of amphibious vehicles, namely for example U.S. Pat. Nos.: 2,416,679, Curtis, Mar. 1947, 2,306,577, Walker, Dec. 1942, 2,359,586, Sayler, Oct. 1944, 3,146,035, Bonmartini, Aug. 1964, 3,180,305, Gower-Rempel, Apr. 1965, 3,204,713, Shanahan et al., Sept. 1965, 3,238,913, Slemmons, Mar. 1966, 3,396,690, Tsunazawa, Aug. 1968, 3,481,654, Hartlerode, Jr., Dec. 1969.

However, these prior devices have not provided for single steering wheel and propulsion control means to provide optimum maneuverability of endless track means on land of all terrain formations and on water surfaces. Also, the present invention is an improvement of the prior art by the highly efficient steering and lever control of an electric transmission system coupled to traction drive belts.

BRIEF SUMMARY OF THE INVENTION

The present invention relates to improvements in Landing Craft and contemplates an amphibious vehicle employing identical propulsion, steering and control mechanism on land and water.

More particularly the landing craft in design is essentially a crawl type tractor employing two laterally spaced belts of suitable durible flexible material, such as plastic, each belt passing over and around a series of revolvable drums with the fore and aft drums being drivably connected with electric power transmission means. The actual number and size of the drums are calibrated and proportioned to produce a displacement when half submerged to thereby develop sufficient buoyancy to provide a payload capability that will justify the cost of operation. Containers are now commercially available to meet such payload requirement.

Further in regard to optimum payload requirements in the event more vehicle speed or enhancement in payload capability is needed, without increasing the length of the vehicle, each drum may be provided with two suitable cocks and valves so positioned that air in the respective drums may be replaced with gas means, such as helium. This should be done before the drums are assembled in the vehicle drive belts. These belts are laterally spaced to provide for suitable protrusions on the drum surfaces, such as annular fins around the drum surfaces to prevent lateral crawl of the respective belt means as shown in the accompanying drawings. The drawings also illustrate means of simultaneous inflation of suitably attached transverse tires disposed transversely of the drive belts, such as tubeless pneumatic tires. If helium is substituted for air as discussed hereinbefore the speed of the vehicle as well as the payload may be increased.

The motive power of the vehicle is provided by a reciprocating diesel motor driving a dual output D-C generator provided with a self-exciting exciter.

The transmission of the vehicle of the present invention is completely electrical. Change of direction from forward to reverse is accomplished by changing polarity of the feed circuits to all four motors. The feed circuits to each port or starboard pair of motors pass through separate rheostats controlled by the vehicles steering wheel. When the wheel is turned to the left, resistance is gradually introduced by the rheostat of the circuit feeding the left hand motors thus lowering the speed of the left hand drive belt causing the vehicle to turn left. When the wheel is turned to the right a similar action takes place in the opposite direction by connecting the starboard rheostat to feed the right hand pair of motors with driving current.

Brakes are unnecessary as the tracks cannot be thrown out of gear with the connected driving mechanism. The speed of this vehicle is regulated by the foot actuated accelerator pedal at the driver's seat which controls the flow of fuel to the diesel motor.

The landing craft has no body or hull to be pushed or pulled through or on the water. The deck is supported on three fins or girders and is preferably fabricated of aluminum preferably not more than 3/16 inch thick, and do not submerge more than approximately 6 inches, for example, at maximum loading. These fins accommodate the bearings for the axles of all the drums, as shown in FIGS. 2 and 3 of the drawings and described hereinafter.

The vehicle of the invention is suitably designed for use as a trailer, and is precisely the landing craft herein described and illustrated, less the power plant.

With one simple center line hitch of any known suitable type with the towing vehicle, and a towed vehicle coupled to the hitch will track precisely and if desired will execute right angle turns.

The most economical use of the vehicle in ship-to-shore movement of materials will be the use of the present vehicle to tow trailer units. Thus more goods can be moved per trip than can be moved by two trips using only a powered vehicle.

OBJECTS OF THE INVENTION

An object of the invention is to provide a novel endless track means with inflated surface cross tires for amphibious vehicles having pneumatically or gaseously inflated drums to provide for optimum payload floatation and propulsion in the water or travel on land.

Another object is to provide a novel drive arrangement of laterally spaced endless belts mounted in side-by-side relation around transversely spaced floatation drums.

Another object of the present invention is to provide a steering means for the vehicle of the present invention which enables the operator to steer the vehicle in a similar manner to a conventional automobile.

Still another object of the present invention is the provision of a vehicle which minimizes drag by eliminating conventional hull means.

Yet another object is to provide control of payload by floatation with resulting superior action over water and boggy surfaces.

The above and other objects and advantages of the present invention will appear more fully hereinafter from a consideration of the detailed description which follows, taken with the accompanying drawings wherein the invention is illustrated. It is to be understood, however, that the drawings are for the purpose of illustration only and are not intended as a definition of the limits of the invention.

BRIEF DESCRIPTION OF THE DRAWINGS

FIG. 6 is a front elevation view of the forward and reverse control lever adjacent to the vehicle driver's seat operatively connected to the forward-reverse control switch and connected circuitry of the system;

FIG. 6A is a side elevation view of FIG. 6;

FIG. 7 is a side elevation view of FIG. 6;

FIG. 8 is a top partial view in side elevation of the portion of the control lever handle grip and release button of FIG. 7;

FIG. 9 is a plan view of the wiring on the bottom switch plate under control of the handle mounted plunger arranged to open the circuit to the exciter and to the respective generator and drive motor circuits;

DETAILED DESCRIPTION OF THE INVENTION

Figure 1:
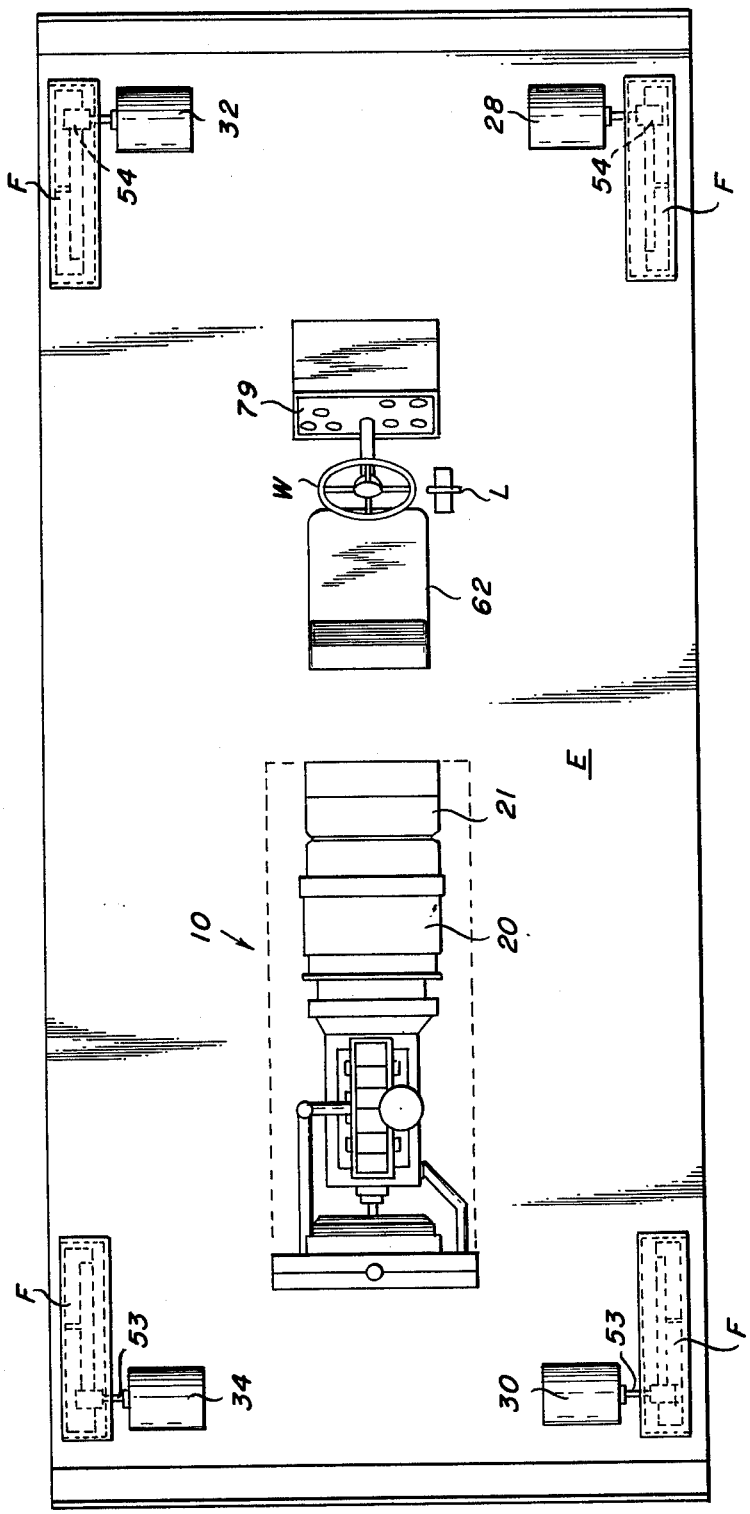
FIG. 1 is a top plan view of the deck or floor of a vehicle showing electric drive motors, drive gear means to the driven floatation drums and drive belts, the diesel power plant and D.C. generator set electrically connected through gear means to the drive motors, the driver seat, steering wheel and motor speed controls and forward, reverse and neutral control lever of the system.
Figure 2:
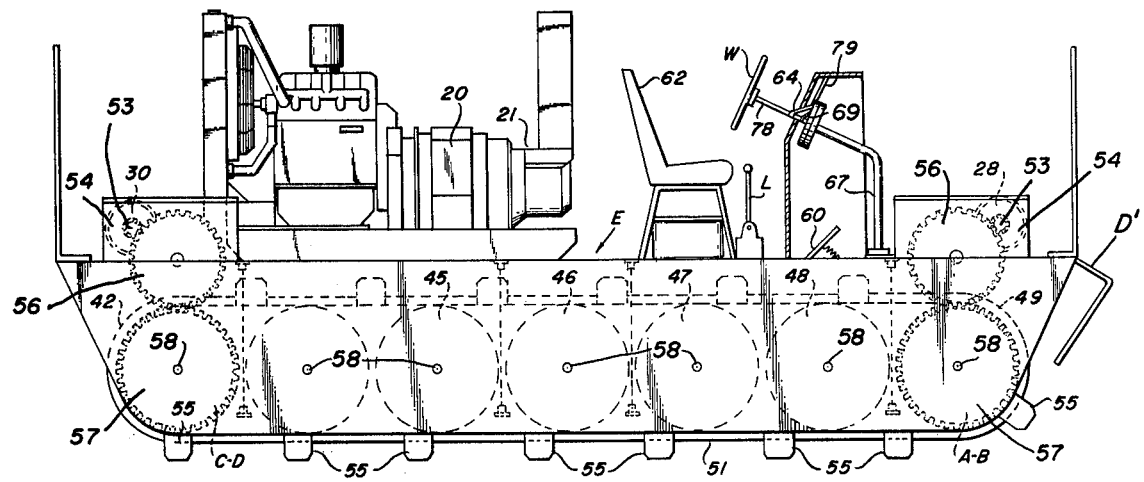
FIG. 2 is a side elevation view of the vehicle including a showing of the buoyant spaced drive and idler drums and wide continuous flexible belt means with attached pneumatic cross tires or elongated inflated cleats.

Referring in detail to the invention and first with reference to FIGS. 1, 2, 3 and 13, there is illustrated a preferred embodiment of the same generally comprising a suitable diesel engine 10 with power output and take-off circuitry connected from a D.C. exciter-generator 20, see FIG. 1. Generator 20 is electrically connected to energize fore and aft electric drive motors 28 and 30 on one side of the vehicle deck E and similarly spaced fore and aft electric drive motors 32 and 34 on the opposite side of the deck E. These motors are each respectively supported on the deck E adjacent fenders F which are open at one side to permit extension of the respective rotor shaft means 53 into the open sides of the respective fenders. A spur drive gear 54 is keyed to each of the shafts 53. Spur gears 54 mesh with a relatively large gear 56 which is in turn meshed with the driven gear 57 of the respective power drums A, B, C and D to impart drive of the endless traction belts 50 and 51. These belts are laterally spaced apart and reeve or loop over and around the finned power drums and around and over idler drums 44, 45, 46, 47 and 48 at each fore end 42 and aft end 49 as shown in FIG. 2. These idler drums are supported on cross shafts generally indicated by numeral 58 as they are identically journalled in each of bearings 59 carried by the panels or fins 60 depending from the deck E, see FIG. 3. These fins serve to steady the vehicle as it is propelled through bog, water or the like.

The motors 28 and 30 are termed the port side motors and the motors 32 and 34 are termed as the starboard motors and are controlled as hereinafter explained by manual manipulation of a lever L or steering wheel W mounted adjacent the driver or operator's seat 62, as hereinafter described in detail with reference to FIGS. 4–9.

The vehicle deck E may be of any suitable passenger and cargo capacity. Dead load and payload is balanced at the fore and aft and intermediate portions by the buoyant pressurized sets of fore and aft power and idler drums, as herafter described in more detail, see FIGS. 2 and 3.

In reference to FIG. 2, the deck E under the belly portions thereof is provided with the said axle mounted sets of the power driven drums A-B and C-D fore and aft of the vehicle, respectively. Each of the drums is embraced or looped and reeved around by the opposite bight ends 42 and 49 of transversely spaced endless belt means 50 and 51 engagable and spanning the intermediate transversely spaced sets of idler and belt guide drums, 44, 45, 46, 47 and 48.

The front of the vehicle has affixed to the deck E a plexiglass windshield and angled downwardly from the deck is a baffle or deflector D' of suitable material, such as fiberglass as shown in FIG. 2. This deflector D' is to direct the oncoming air current during forward drive of the vehicle. Also, more important the underside of this baffle will direct the forward air currents, caused by motion of the cross pneumatic tires downward to the water line thereby assisting to increase the speed of the vehicle.

Figure 3:
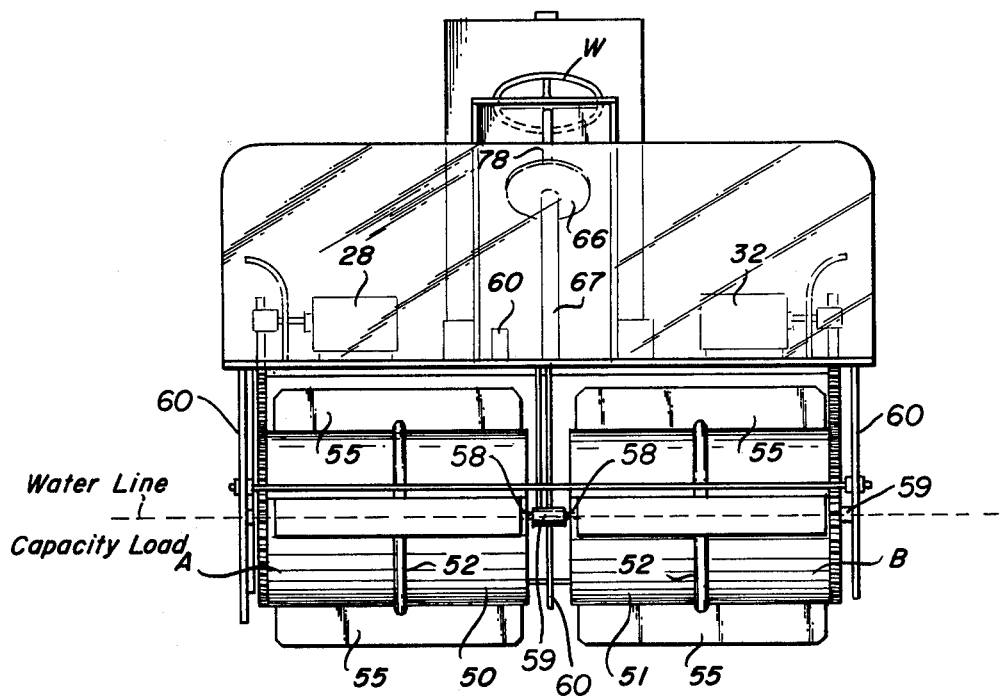
FIG. 3 is a front elevation view of the vehicle.

Each guide or idler drum is formed with an annular rib or fin 52, see FIG. 3, to inhibit lateral displacement of each belt means 50, 51 transversely of the drums. Any number of idler drums may be provided based on calculation for optimum efficiency in operation.

Each tread or medium engaging portion of each endless traction belt means may be formed with pneumatically inflated transverse cleats or cross tires of a straight tubular elongated formation 55. These inflated tubes or tires extend transverse the respective longitudinal reaches of the respective belts at suitably spaced intervals, see FIG. 2. The inflated tires or tubes serve dual purposes, namely to provide traction on land and/or impeller action on water and to further enhance buoyancy of the vehicle for improvement of land or water performance.

Figure 10:
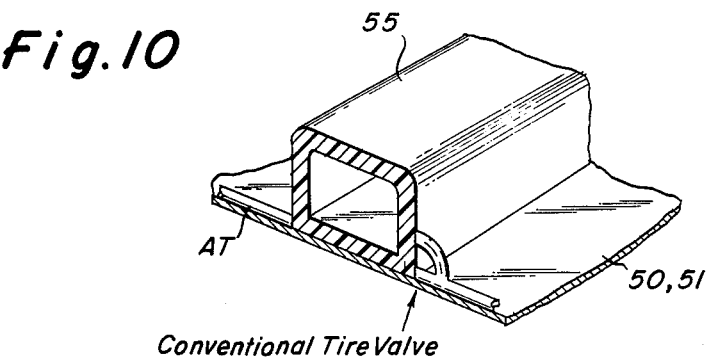
FIG. 10 is a partial perspective view of one of the cross tires attached to one of the power traction belts.
Figure 11:
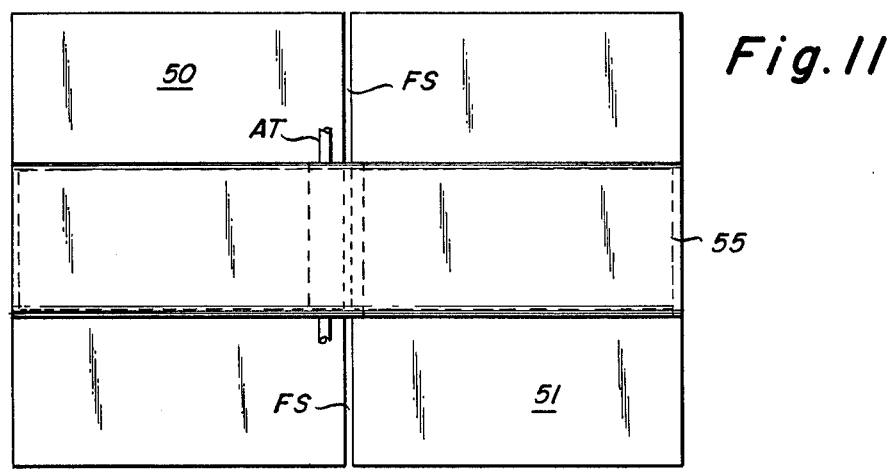
FIG. 11 is a top plan view of the drive belts and two of the cross tires with their respective fin slots to illustrate how the belts are positioned by the fins on the drum means.
Figure 12:
FIG. 12 is a cross section view of an air tube tunnel and an adjacent slot to receive the central belt positioning fin which extends between the inboard longitudinal edges of the belt means.

FIGS. 10, 11 and 12 illustrate the general structure of the pneumatic tires 55 and also show the location of the air inflation tubes AT for simultaneous inflation of the tires and the fin slots FS for anti-lateral disalignment of the traction belts during driving action.

These tires are formed in the shape and form of a railroad cross-tie instead of the conventional shape of a donut as used on motor cars and trucks. Such tires are suitably secured or anchored to the belt means at substantially right angles to the direction of movement and are cross slotted to receive drum fins 52 which extend upward between the spaced belts.

By another modification of this invention the pneumatic cross tires 55 may be replaced by metal tubes loaded with helium instead of air and each drum A, B, 44, 45, 46, 47, 48, C and D may be provided with two cocks and valves, not shown, so placed that the air can be exhausted and replaced with helium in the drums. This is done in the event that more speed or payload is desired without increasing the length of the vehicle. Also, towed trailer units without the power mechanism may be developed to provide a load or a passenger carrying vehicle, whereby the power vehicle primarily then serves as a diesel powered towing vehicle.

Figure 4:
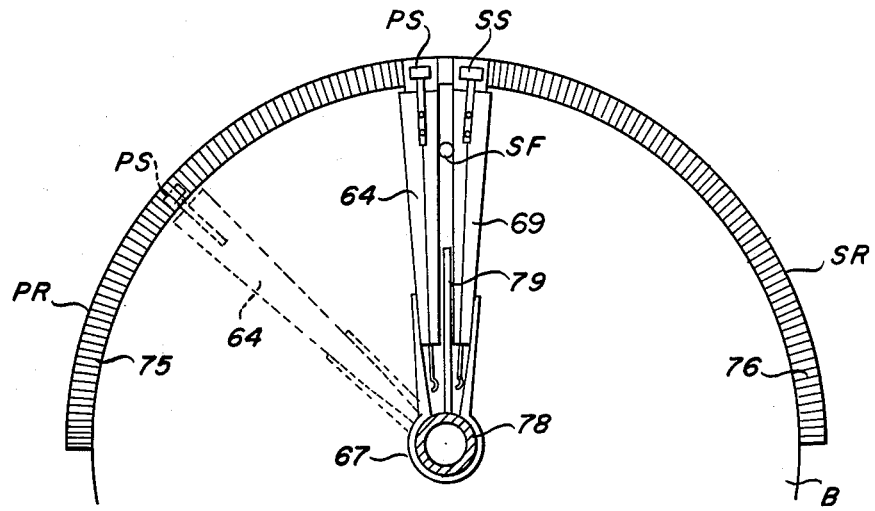
FIG. 4 is a partial detailed top plan view of a rheostat utilized for steering the vehicle of the present invention.
Figure 5:
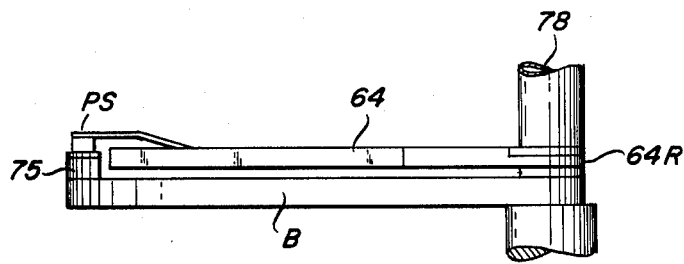
FIG. 5 is a fragmentary detail in side elevation of the port side of the rheostat of FIG. 4 and the manner in which it is disposed on the steering column of the present invention.

The steering system for the vehicle of the present invention can be understood by reference to FIGS. 3, 4 and 5 of the drawings. As illustrated in FIG. 3, the rheostat generally indicated 66 is mounted below steering wheel W on steering column 78. The details of the mounting arrangement of rheostat 66 on column 78 are indicated in the sectional views of FIGS. 4 and 5. For example, FIG. 5 illustrates how rheostat 66 rests on a sleeve 67.

FIG. 4 is a top plan view of rheostat 66 with the top cover removed illustrating the manner in which it is concentrically mounted on steering column 78. Around the circumference of rheostat 66, there is provided a spirally wound nichrome resistance resting on a plastic base B. The wound wire is separated into two separate sections. Each section of wire covers approximately 180° of the circumference of the base or a lesser angle if desired. The right hand section of wire is generally indicated 76 and comprises the resistance of the starboard (right) rheostat SR. The left hand wire section of FIG. 4 is generally indicated 75 and comprises the resistance of the port (left) rheostat PR.

Each of the rheostats PR and SR also include slider means including contact shoes PS and SS, respectively. The contact shoes of the slider means are mounted on slider arms 64 and 69, respectively, which may be fabricated from fiberglass. Each of these slider arms are rotatably mounted on rings on steering column 78. For example, FIG. 5 illustrates slider arm 64 mounted on column 78 by ring 64R. Arm 69 is mounted in a similar manner.

To facilitate the movement of slider arms 64, 69 left or right, there is provided a pusher arm 79 keyed to steering column 78. Pusher arm 79 is disposed between the slider arms 64, 69, so that if it moves to the left it engages and transports arm 64 to the left, and if it is moved to the right it engages or transports arm 69 to the right. When released by pusher arm 79, slider arms 64, 69 will return to the initial positions by the action of return springs, not shown.

In the position shown in FIG. 4, pusher arm 79 is in radial alignment with a stop means SF and slider arms 64, 69 are in abutting relationship with said stop. In this position contact, shoes PS,SS are in the zero positions of the respective rheostats PR,SR. Stated another way, in this position there is substantially zero resistance introduced into the electric motor power system by either rheostat. Therefore, in this position, all drive motors are driven at substantially the same velocity and the vehicle proceeds along a substantially straight path.

However, as contact shoe PS is moved to the left along spirally wound wire 75 or contact shoe SS is moved to the right along wire 76, resistance is gradually introduced into circuit with either the port or starboard drive motors. This change in resistance naturally changes the speed of the port or starboard drive motors, which will cause the vehicle to track right or left as selected.

As described hereinbefore, movement of the slider arms 64, 69 and the contact shoes PS, SS mounted thereon is affected by pusher arm 79 as steering wheel W is turned left or right. Therefore, the vehicle of the present invention may be steered in substantially the same manner as a conventional automobile.

When the vehicle is being steered to go straight ahead, the speed is controlled by acceleration of the diesel engine and its D.C. generator power output to the electric motors 28, 30 and 32, 34, then when the vehicle is to be maneuvered to left or to port, the rheostat is adjusted to slow down the port motors; or if the turn is to starboard, the starboard rheostat is adjusted by turning the steering wheel to the right to slow down the starboard motors.

As further illustrated in FIG. 4 and FIG. 13 to be described hereinafter, the rheostats PR and SR are connected in circuit between generator 20 and port motors 32, 34 or starboard motors 28,30 respectively. It is not believed necessary to show the actual connections for one of ordinary skill in the art would know how to connect a rheostat in circuit between a power source and a motor to which regulated current is to be supplied.

Referring in detail to FIGS. 6–9, there is illustrated the forward and reverse direction control system of the present invention, as well as means for energizing and de-energizing the generator exciter coil.

As illustrated in FIGS. 6–8, there is provided a forward, neutral and reverse control lever L, which includes a shift end 80 engaged in a notch means 81. The shank of the lever is journalled to rock in a bearing 82 held in position between upstanding plates 84 and 86 anchored to the vehicle deck E. The plate 86 extends beyond the bearing 82 under the handle H of the lever and ends in an inturned flange or lug 88 and 89 to which is secured a plate 90 for mounting a switch SW to the exciter circuit and generator circuit. This switch is normally closed and is controlled to open or closed position by a vertical actuator plunger 92 including an end pin 92A extending downwardly under the handle H through a biasing coil spring 94. The pin 92A is arranged to project through an opening 72B to open switch SW on FIG. 8. The activator plunger 92 is moved to switch control positions by a second plunger 95 reciprocably movable against the bias action of a coil spring 96 mounted between the underside of the head of a release button 97 and the surface 98 of a cam means 99. This cam 99 engages in an aperture in the free end 101 of the activator plunger 92 and provides for opening the switch SW to open the circuit to the exciter 21 to cut out all power to the electric drive motors. When the shift lever is moved to either a forward or a reverse position, the respective motors may again be energized and may be controlled, For example as referred to in FIGS. 4 and 5 and FIG. 13 to be described hereinafter.

More specifically, the cam 99 engages with the terminal upper end 101 of the plunger 92 which is provided with a cam follower in the form of an aperture 101A. The cam 99 as it is moved through the aperture 101A by the push button actuated cam plunger 95 serves to raise the plunger 92 to lift the pin 92A from the opening 92B in the plate 90. This permits the contact spring arm of the switch SW to close, so the shifter handle H can then be moved to forward or reverse, see FIGS. 6, 6A and 8.

Release button 97 may be actuated in any of the three positions of lever L and by cutting power in this manner, a dynamic braking action may be effected by motors 28, 30, 32 and 34.

Referring in further detail to FIGS. 6, 7 and 9, there is illustrated a motor polarity reversing switch generally indicated 100 including two relatively slidable contact plates 100A, 100B. Upper plate 100A contains spring biased movable contacts 68, 70 and slot 81 for receiving end 80 of lever L. Bottom plate 100B contains four stationary contacts 102A, 102B, 102C, 102D. Contacts 102A, 102D are connected to each other by wire 104, while contacts 102B, 102C are connected to each other by wire 106. For purposes of illustration, contact 102A is also connected to the positive terminal of generator 20 and contact 102B is connected to the negative terminal of generator 20. Movable contacts 68, 70 are connected in circuit with the electric drive motors via rheostats SR, PR.

The manner in which the polarity of electric current to the drive motors is controlled can be best understood by reference to FIG. 9. Movable contacts 68, 70 are adapted to bridge either contact pairs 102A, 102B and 102C, 102D in forward and reverse positions, respectively.

As further shown in FIG. 9, if contacts 68, 70 bridge contacts 102A, 102B current flows in the direction $I_1$ through all four drive motors connected across contacts 78, 70. However, if contacts 68, 70 bridge stationary contacts 102C, 102D current flows in the opposite direction $I_2$ through the drive motors. Accordingly, the drive motors can be driven either in a forward or reverse direction by means of lever L and polarity changing switch means 100.

DESCRIPTION OF OPERATION

Figure 13:
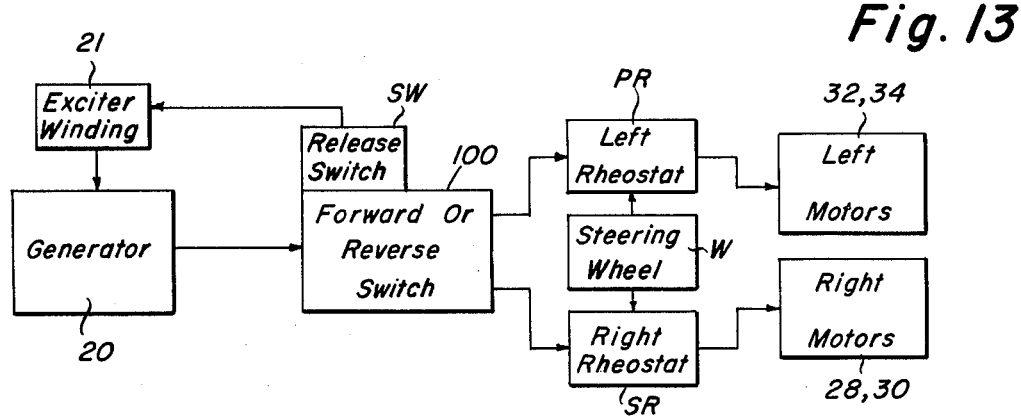
FIG. 13 is a simple block diagram of the electric transmission system of the present invention.

The general operation of the vehicle of the present invention can be readily understood by reference to the system diagram of FIG. 13 in conjunction with FIGS. 1-12 described hereinbefore.

To operate the vehicle, the diesel engine is started by an ignition switch in a conventional manner to drive generator 20. Release switch SW is normally closed enabling exciter winding 21 of generator 20. Thus generator 20 puts out a D.C. voltage which is fed through forward-reverse polarity switch 100 and rheostats PR, SR to the right and left motors 28, 30, 32, 34. However, if lever L is in neutral, no current flows to these motors. Generator 20 may be driven fast or slow as in a conventional automobile by the degree to which accelerator pedal 60 (FIG. 2) is depressed. This, of course, supplies more or less fuel to diesel engine 10 and more or less current to the drive motors, thus effecting their speed of rotation.

If it is desired to turn the vehicle to the right, steering wheel W is turned to the right gradually introducing the resistance of rheostat SR into circuit with motors 28, 30. This causes starboard motors 28, 30 to slow down relative to the speed of port motors 32, 34. Thus, the vehicle turns to the right.

If it desired to turn to the left, steering wheel W is turned to the left, the port motors slow down, and the vehicle turns to the left.

If it is desired to stop the vehicle, switch button 97 of switch SW is depressed de-energizing exciter 21, which cuts off the voltage output of generator 20. It should be noted that brakes are unnecessary as the respective tracks or belts cannot be thrown out of gear with the driving mechanism.

The forward or reverse direction of the vehicle is controlled by switch 100 in a manner discussed hereinbefore.

Thus there are provided new improvements in amphibious landing craft and cargo moving trains of such craft, such improvements being namely:

1. The use of revolving drums without the aid of a hull as the total buoyancy means of the vehicle.

2. The use of the drums as a support as well as for the propulsion means of the vehicle.

3. The provision of a simple slide switch for reversing polarity with novel switch on and off electric power control for driving the vehicle.

4. Highly efficient simple maneuverability of such dual type tractors by a steering wheel combined with the use of a diesel-electric propulsion system comprising an electric transmission with an exciter-generator and novel switch arrangement for idling of the generator by opening the circuit of the exciter and manual lever means to reverse the electric power motors by changing polarity of the power circuit of the system.

Without further description, it is believed that the advantages and operation of the present novel vehicle and its power system are apparent and while only two embodiments are illustrated of the endless belt track treads, it is to be expressly understood the same is not limited thereto, as various changes may be made in the design and arrangement of the device, as will probably appear to those skilled in the art.

For a definition of the scope of limits of the invention, reference should be made to the appended claims.

It is claimed:

1. A vehicle for land or water travel comprising a planar deck and a plurality of depending fins from the underside of the deck, a source of power mounted on the upperside of the said deck, transversely spaced sets of buoyant power drums mounted on power drum axle means supported between the fins selectively rotatably driven by said power source in either a clockwise or a counterclockwise direction, said transversely spaced sets of power drums each being mounted on said axle means driven by said power source, one of each set of power drums being mounted at the respective fore and aft ends of the vehicle, dual spaced sets of buoyant idler drums mounted on idler drum axle means in substantially parallel relation to and longitudinally between said spaced sets of fore and aft power drums mounted on said power drum axle means, an endless belt reeved around each of said sets of transversely spaced sets of buoyant idler drums, said endless belts having inflated transverse cleats thereon to help maintain said deck above a water line of the vehicle, gear means for each of said power drums keyed on said axle means to rotatably drive said endless belts with said cleats to effect propulsion of said vehicle and said buoyant idler drums and said inflated transverse cleats, said source of power comprising a diesel engine directly coupled to drive a generator means and provide energization of port and starboard electric motors, each motor having a rotor shaft and a drive gear in mesh with the said gear means of said power drums to impart drive to each respective set of power drums at the fore and aft of said vehicle, steering means for selectively changing the speed of the power drums on the left or right of the vehicle, said steering means comprising a steering wheel, a steering column and a sleeve below said steering wheel on said steering column, said steering wheel being keyed to said column to turn the same to the right or left in said sleeve, rehostat means including respective port and starboard resistance sections supported by said sleeve around said steering column, a pusher arm keyed to said steering column movable to right or left by said steering wheel, ring mounted slider arms movable over said resistance sections by said pusher arm responsive to rotation of said steering wheel and steering column, said rehostat resistance sections and slider arms being in circuit between said generator means and said motor means for selectively varying the resistance of said resistance sections in circuit with said port and starboard motors drivably coupled by said motor drive gears to the gear means of the said power drums on the left or right side of the vehicle, to thereby change the speed of the power drums on the left or right side of the vehicle, and a manual lever means to provide a forward, neutral and reverse control of the vehicle drive motors, to thereby coact with the manual turning of said steering wheel for control of the vehicle.

2. The vehicle of claim 1 wherein said manual lever has a shank including a handle in the provision of a handle end and a shift end opposite to said handle engageable in a notch means, a bearing, said bearing being held in position between upstanding plates to rockably support said lever, said plates being anchored to said vehicle deck, one of said plates having an inturned portion extending beyond said bearing spaced below the handle of said handle end to provide a mounting plate, a switch to control said generator means of said system mounted on the underside of said plate, said plate being formed intermediately with an opening, said switch having a spring arm normally biased to a closed position, an actuator plunger formed with an apertured cam follower head portion movable vertically to open said switch, said plunger including an end pin engageable with said plate and projectable into said opening therein upon rocking said lever to a central neutral position to hold said switch arm open by said handle, said handle being formed with a bore to receive a second plunger, said second plunger having a manual release button exposed for manual contact at one end, a cam on the opposite end of said second plunger, a coil spring mounted on said second plunger engaged by the inboard face of said push button and the opposite facing surface of said cam, whereby when said button is pushed against the bias action of said spring, movement is imparted to said cam to engage through the aperture in the said cam follower head portion of said first named activator plunger to thereby raise the plunger and the said end pin to thereby close the switch to facilitate forward or reverse drive of said vehicle.

* * * * *